Aug. 4, 1953            J. YOLLES            2,647,310

SPOON

Filed Nov. 21, 1951

INVENTOR.
JACK YOLLES
BY
*John D. McLean*
HIS ATTORNEY

Patented Aug. 4, 1953

2,647,310

UNITED STATES PATENT OFFICE 2,647,310

SPOON

Jack Yolles, Dayton, Ohio

Application November 21, 1951, Serial No. 257,506

1 Claim. (Cl. 30—149)

This invention relates to improvements in spoons, and has for its object to provide a spoon that can be readily inserted into foods, fruits, melons, or grapefruits. For this purpose the spoon is provided with entrance tines on its end and with saw teeth on the sides of the spoon adjacent the entrance tines. These teeth may extend through the thickness of the spoon or they may extend partially through the spoon leaving thereon a web or blade like structure that will aid in cutting the food.

It is an object of this invention to provide a spoon bowl which has thereon relatively slender tines, providing space between the tines which terminate in an angular cutting section.

These and other advantages will appear from the following description taken in connection with the drawings in which.

Figure 1:
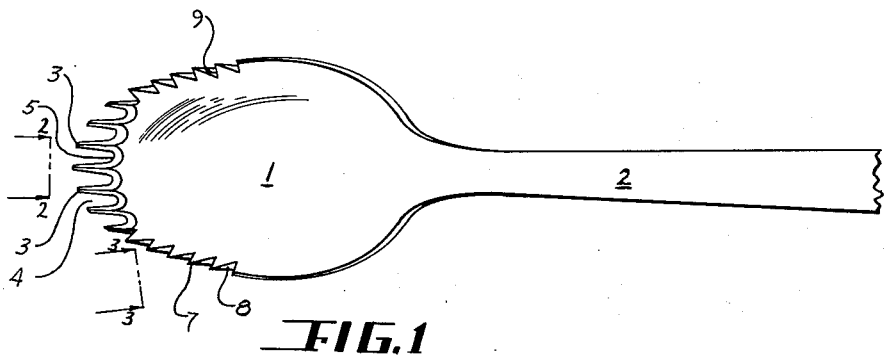
Figure 1 is a top plain view of a spoon formed in accordance with applicant's invention.
Figure 2:
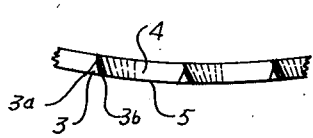
Figure 2 is a view looking at the end of the spoon on line 2—2 of Figure 1.
Figure 3:
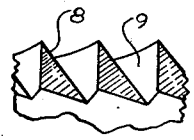
Figure 3 is a view of the spoon taken on line 3—3 of Figure 1.
Figure 4:
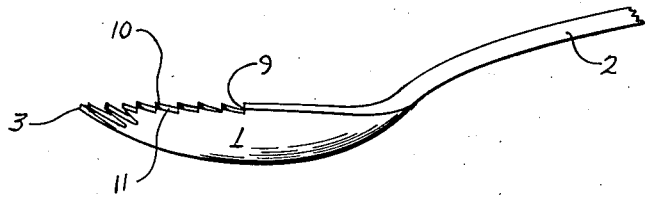
Figure 4 is a slightly modified form of spoon in which the cutting teeth have no cutting blade or web.

The numeral 1 is used to designate a bowl of a spoon which has thereon a handle 2. On the end of the bowl as shown on Figure 1 opposite the handle 2 is a plurality of tines 3, slender and elongated for puncturing purposes. Between the tines are spaces 4. At the bottom of each space between the tines is formed an angular cutting section 5. Adjacent the teeth 3 and on the sides of the bowl is a series of saw teeth 7, which have between them and separating them notches 9 as shown in Figure 1. The notches 9 are partially cut through the spoon so that there is left a web or blade like structure 8. It will be noticed that these teeth project toward the end of the spoon in the form of saw teeth. In Figure 4 there is shown a bowl similar to that as shown in Figure 1, but in this one there are no lateral webs or blades. The teeth stand out in the form of saw teeth projecting toward the end of the spoon. In this form the teeth are indicated by the number 10, while the spaces are indicated by number 9.

In its application this spoon is well adapted for use in eating grapefruit. Whatever purpose the spoon is used the tines are inserted into the fruits or vegetables for the initial cutting or separating operation. After the tine end of the spoon has been inserted the spoon will manipulate so that the teeth on the edges or sides will cut the particles freely so that they may be easily removed by a kind of spading action of the spoon. The tines are easily inserted into any fruit or vegetable and then the spoon is moved to complete the cutting act. These tines aid in the inserting and the initial cutting of the material to which the spoon is applied. The further cutting of the spoon may be done by manipulating the spoon so that the teeth will continue the cutting assisted by the angular cutting sections.

The tines 3 are angular in shape and have their lower edges sharp as indicated by the numerals 3a and 3b for cutting purposes.

What I claim is:

In a spoon, a bowl having a handle, a plurality of elongated tapered tines integral with the bowl and positioned at the front thereof and diametrically opposite to the handle, said tines being sharpened on both edges and joined at their bases by arcuate cutting edges for initially cutting into citrus type fruit for removal of its sections, and a plurality of closely aligned cutting teeth in the form of saw teeth arranged integral with and along each lateral edge of the bowl, whereby reciprocating motion of the handle causes the teeth to fully separate fruit sections initially cut by the cutting edges of the tines.

JACK YOLLES.

References Cited in the file of this patent

UNITED STATES PATENTS

| Number | Name | Date |
|---|---|---|
| D. 58,685 | Rayder | Aug. 9, 1921 |
| 868,583 | Schuyler | Oct. 15, 1907 |
| 880,166 | Ruggles | Feb. 25, 1908 |
| 1,479,015 | Steinman | Jan. 1, 1924 |
| 1,827,780 | Chambers | Oct. 20, 1931 |
| 1,911,974 | Shelton | May 30, 1933 |

FOREIGN PATENTS

| Number | Country | Date |
|---|---|---|
| 428,837 | Great Britain | Jan. 31, 1935 |